United States Patent [19]
Roth et al.

[11] 4,098,603
[45] Jul. 4, 1978

[54] METHOD FOR MELTING STEEL

[75] Inventors: Haye Roth, Breitscheid; Gero Rath, Mulheim, both of Germany

[73] Assignee: Demag A.G., Duisburg, Germany

[21] Appl. No.: 723,040

[22] Filed: Sep. 13, 1976

Related U.S. Application Data

[63] Continuation of Ser. No. 562,350, Mar. 26, 1975, abandoned.

[30] Foreign Application Priority Data

Apr. 2, 1974 [DE] Fed. Rep. of Germany ....... 2415967

[51] Int. Cl.² ............................................. C21C 5/52
[52] U.S. Cl. ............................................. 75/11; 75/12
[58] Field of Search ......................................... 75/10–12

[56] References Cited

U.S. PATENT DOCUMENTS

| | | | |
|---|---|---|---|
| 2,523,092 | 9/1950 | Byrk | 75/11 |
| 3,163,521 | 12/1964 | Rinesch | 75/12 |
| 3,215,522 | 11/1965 | Kuhlmann | 75/10 R |

*Primary Examiner*—Peter D. Rosenberg
*Attorney, Agent, or Firm*—Mandeville and Schweitzer

[57] ABSTRACT

A process and apparatus are provided for producing steel of more uniform grade on a continuous basis by maintaining a comparatively thick slag layer and a larger quantity of molten steel product in an electric arc resistance furnace. This is achieved partially by including in or combined with a quantity of the charge a quantity of iron sponge, or by using a pre-reduced and/or agglomerated or otherwise pelleted ore charge. By using a charge which is comprised of comparatively small-sized particles in combination with a thick slag layer, the charge is readily assimilated into the thick slag layer. This reduces the exposure of large particle size charge material surfaces to hot spots caused by arcing at the charge-slag interface. The comparatively thick slag layer and the continuously maintained large metal bath balance and assimilate additional charge quantities to produce an ultimately more uniform product. Because of the thick slag layer, the upper surface thereof can be maintained comparatively cooler for receiving the charge, thus again reducing localized hot spots at the slag-charge interface. These factors reduce deterioration of the furnace lining and inlet feed surfaces, as well as enhancethe efficiency with which the applied electrical energy is used.

4 Claims, 1 Drawing Figure

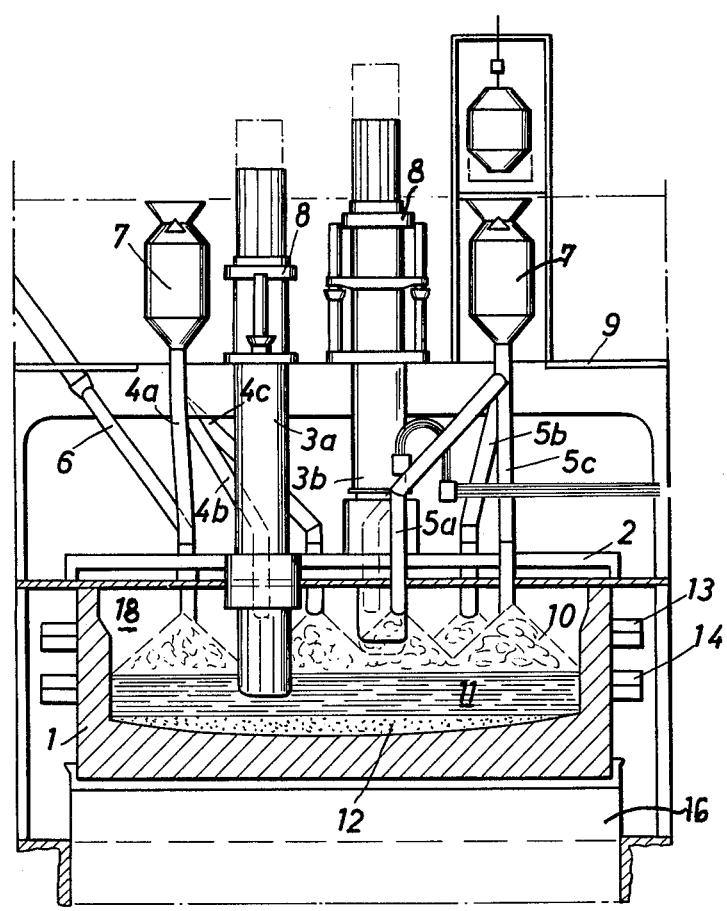

METHOD FOR MELTING STEEL

This is a continuation of application Ser. No. 562,350, filed Mar. 26, 1975 and now abandoned.

BACKGROUND AND SUMMARY OF THE INVENTION

The invention involves methods for melting steel in a closed electric arc resistance furnace in which a layer of slag is used to cover the molten metal. Since the development of a technique for producing iron sponge, it is now possible to produce steel in an electric arc resistance furnace because of the electrical properties of the iron sponge. Due to its content of slag-forming substances and its high porosity, as compared to the previous use of relatively solid charge materials not previously treated to enhance their reducing properties, the iron sponge makes possible a more efficient use of the electrical energy applied to the furnace during the melting process, because of a much better degree of energy distribution.

In steel production today, more and more metallurgical treatments to secure products of specific properties are performed outside the furnace. This is especially true during tapping of the product from the furnace and in the pan receiving the molten steel from the furnace. For example, the pan may be placed under a vacuum in order to obtain certain qualities in the steel product. In some instances, it is appropriate or required to carry out further treatment in additional furnace units, such as an induction channel furnace, for example.

When an electric arc resistance furnace is operated in the usual manner by batch charging and removal of the product, the analysis of the final steel product is subject to certain changes from charge to charge, as changes in the composition of the charge content cannot be avoided. For example, those metallurgical processes which depend to a large extent on the content of carbon, sulphur and phosphorus in the charge, are particularly sensitive to changes in the charge from batch to batch. Thus, with such batch production, the resulting product, which is tapped sequentially in a batched manner or received in a pan, and which is to undergo a subsequent metallurgical refinement, requires additional expensive adjustments in order to compensate for the differences in the different batches as they are received from the furnace.

As will be appreciated with respect to processes as discussed herein, there is a momentary relatively violent interaction between a new charge introduced into the furnace and the heated slag or electrode surfaces with which the new charge comes into contact. This relatively violent interaction causes, as a by-product thereof, the evolution of polluting gases. Because the methods and apparatus herein reduce this momentary violent reaction when a charge is introduced, there is a substantial reduction in gases emitting from the furnace, thus reducing to a substantial amount the polluting gases emanating from the furnace and requirements for equipment to cope with these polluting gases.

With the method of the invention here, the above results are achieved by three basic procedures, including (a) the incorporation into a charge of iron ore a quantity of iron sponge. Alternatively, the ores may be pre-reduced or agglomerated into small pellet-like form or briquets which provide for ready assimilation of the charge into the content being maintained in the furnace chamber, including the slag cover and the molten steel bath. (b) Further, a thick slag cover containing decarbonizing, dephosphorizing and desulphurizing properties is maintained, with the thickness thereof being, preferably, within the range of between about 250–1500 mm. Moreover, the production process is carried on for a much longer period than the previous batch-type processes, and is usually carried on for a period of 1 to 10 days. (c) In addition, a molten metal bath is maintained with its quantity being the same as a quantity which would be produced in a period within the range of 5 hours-2 days.

By utilizing these measures, it is possible to run the electric arc resistance furnace continuously. The iron oxide content in the slag required for decarbonization of the ore into a desired product is achieved by charging iron ore combined with iron sponge. In the alternative, pre-reduced ores or agglomerates may be used, and they are adjusted during the pre-reduction procedures to be of a desired grade. Because of the maintenance of the comparative thick slag layer and the large metal bath, this maintenance serves to balance variations in the properties of the charge introduced from time to time into the furnace chamber. Because of this maintenance of the relatively thick slag layer and large metal bath, newly introduced charge material is rapidly assimilated, thus reducing, as discussed above, the amount of surface area of the charge particles exposed to a violent interaction at the charge-slag interface. This in turn reduces the necessity for varying and controlling temperatures upon the introduction of the charge for the feeding process, as opposed to the subsequent melting process. Then, because of this more uniform application of temperature, there is a lower initial temperature at the charge-slag interface, thus increasing the service life of the furnace lining and the charge inlet surfaces. Moreover, because of this uniformity of energy use, better results are achieved, than with respect to the prior art bath processes with reduced applied energy. Environmental pollution is reduced, as discussed above, because the evaporation of metal at the charge-slag interface is lessened by the rapid assimilation of the charge into the thick slag layer with reduced "hot spots" or burning surfaces.

Of special advantage in the use of the invention here over conventional batch-type charge operations is that for an approximately equal investment cost per ton-year of steel (unrefined) produced, a substantial reduction in the cost of the furnace lining is obtained. The strong thermal stresses on the furnace cover and the side walls thereof are reduced by lessening heat radiation from the furnace electrodes. This is so because the electrodes are either immersed in the thick slag layer or covered by the burden or charge resting on the metal bath. Both because of a reduction in these radiation losses from the electrodes, because they are immersed in the slag during the melting period, and because of reduction in variations in energy requirements during charging operations, the energy requirements per ton of finished product, in accordance herewith, are, conservatively, at least about 10% less than with previously employed methods. Previously, the energy requirements were about 600 kilowatt hours/ton of steel, while with the invention here the energy requirements are about 540 kilowatt hours/ton of steel.

Further with respect to energy requirements, and particularly when electric energy is secured from an outside source, because of the relatively uniform energy requirements over the entire period of operation, there are no peak demands as during charging operations in the batch processes of the past.

With respect to further treatment operations, such as the utilization of strand casting equipment, with the continuous method here, and a continuously tapped and produced product, the strand casting equipment may be operated on a continuous basis, rather than depending upon the intermittent operation of conventional furnaces. Another advantage to the invention here is that because the molten steel bath is covered by the thick slag layer, it absorbs less nitrogen from the air than would be the case without such a thick covering. Furthermore, the method here permits the use of a lesser quality of charging ore because the thick slag layer permits the use of charge materials with a high slag content.

A further teaching of the invention is that it permits the use of hollow electrodes which allow for the simultaneous feed through the electrodes, as the case may be, together with reacting oxygen gas to increase the refining effect. Moreover, in those instances where large masses of steel are to be produced by the method here, the continuous method permits the addition of alloying substances outside the furnace in the pan during tapping, with subsequent alloying aggregate additions or other refinements to the final product.

With the apparatus of the invention here, the furnace chamber is equipped with at least one tap for the molten metal product and one for the slag, which are arranged at different heights from each other. Because of the maintenance of the very thick slag layer and large molten metal bath, a localized cooling may be applied to the slag layer in a concentrated manner.

As illustrative of apparatus which is useful for carrying out the invention, reference is made to the following drawing showing an electric arc resistance furnace.

DESCRIPTION OF THE DRAWING

FIG. 1 is a somewhat diagrammatic side elevational view in section of an electric arc resistance furnace for melting various materials in the production of steel.

DESCRIPTION OF THE INVENTION

As shown in FIG. 1, vessel 1 rests on a base support 16, with vessel 1 having a cover 2. Hollow electrodes 3a and 3b extend into the chamber 18 of vessel 1. The electrodes 3a and 3b may be, for example, Soederberg electrodes, which are less expensive than conventional graphite electrodes usually employed in the conventional smaller arc furnaces. As such, their dimensions may be much larger, with diameters of, for example, 2000 mm. as compared to a maximum diameter of 600 or 700 mm. for a conventional graphite electrode.

Feed pipes 4a, 4b and 4c, as well as 5a, 5b and 5c are arranged around electrodes 3a and 3b. These feed pipes are connected to feed silos 7 supported outside the furnace chamber 18.

As shown in FIG. 1, a crude gas feed pipe 6 may be included connected to one of the charge feed pipes for introducing refining gas to chamber 18. Supports 8 for electrodes 3a and 3b are disposed on a supporting frame 9 which, in turn, is supported on base support 16. As shown, supports 8 for electrodes 3a and 3b include reversible arrangements for accommodating the immersion of electrodes 3a and 3b into the thick slag layer 11 as it moves upwardly in chamber 18, by accumulation of a larger quantity of molten metal 12.

Vessel 1 is equipped with two taps 13 and 14, spaced vertically from each other a desired distance so that the upper tap 13 may be used to withdraw the thick slag layer 11 while lower tap 14 may be used to withdraw the molten steel product 12.

Although not shown for clarity, that portion of the chamber 18 which contains thick slag layer 11 may have applied thereto a cooling jacket, as will be understood, for controlling the temperature level of slag layer 11.

In accordance with the invention here, a continuous refined product may be achieved with a controlled burden contained within the slag of a constant iron oxide content of between about 15–17%. As will be appreciated, this corresponds to normal slag conditions in conventional electric arc resistance steel mills. As will be appreciated in the continuous process of the invention here, the slag layer thickness is maintained constant through the utilization of tap 13. With the use of the thick slag layer of the invention, the electrodes are immersed in the slag layers without touching the metal bath. Thus, the slag layer transfers heat by convection from the slag to the metal bath. By proper placement of the slag tap 13 above steel tap 14, there is a continued maintenance of good heat potential as well as even heat distribution. In addition, the thick slag layer produces good dephosphorization and good desulphurization. For example, in addition to the usual normal reaction between the metal bath and the slag layer at the metal bath-slag layer interface, a predephosphorization and a pre-desulphurization take place when the charge particles or pellets, after having been added on to the slag layer and floating on top, melt and sink through the thick slag layer as droplets of molten iron.

Accordingly, there is a continuous refining action taking place for the burden as it passes slowly through the very thick slag layer prior to arrival thereof at the slag-molten bath interface. Because of the pellet-like or briquet characteristics of the charge in the first place, the large specific surface areas of the metal drops cause an enhanced interaction between the slag content and the metal drops as they pass through the slag. As heat transfer takes place from the slag heated by the immersed electrodes to the metal bath, and because this is done by convection only, it is appropriate, in accordance herewith, for the slag temperature to be maintained at a slightly higher level than the tap temperature of the molten metal. For example, if it is desired to have the steel tap temperature at 1650° C. (with subsequent argon rinsing), the slag temperature must be 1670° C. A representative slag, for example, at these temperatures may have a melting point of 1620° C. with super-heating thereof by about 50° C. A representative slag may be comprised of about 15% iron oxide, about 20% silicon dioxide and about 65% calcium oxide.

Thus, as will be appreciated from the foregoing, there are provided, in accordance herewith, methods and apparatus for the continuous production of molten steel from iron ore by maintaining a comparatively very thick slag layer of controlled thickness so that the reducing electrodes may be immersed in the slag layer, to produce and apply heat to the molten metal disposed underneath the slag layer by convection application of the heat only. Because of the very thick slag layer, variations in the temperature thereof may be maintained between the upper surface which receives the charge and the bottom interface thereof with the molten metal bath. This variation in temperature provides for a lessening of an interaction between the charge surfaces and the slag layer upon introduction into the chamber, with the individual particles of the charge being melted and pre-refined as they pass through the thick layer for final refining at the slag-molten bath interface. Also, because of the use of pre-reduced, pelletized charges or a combined ore-sponge iron charge, the charge is readily assimilated into the slag layer to reduce "hot spots" in the furnace chamber above the upper slag surface. This, in turn, reduces deterioration of the furnace lining and the feed inlet linings. Further, because of this rapid assimilation of the charge into the thick slag layer, there is no need for variation in energy requirements between a melting temperature and a refining temperature. This results in a much more efficient utilization of a lesser amount of electrical energy for the same amount of product produced. Furthermore, because of the continuous nature of the method and apparatus herein, the energy requirements are on a continuous level, thus reducing the total energy requirements for the entire production run. The ultimate product is much more uniform, because it is produced on a continuous basis and the relatively thick slag layer and the contained large quantity of molten metal serve to balance any nonuniformity in the subsequent introduction of charge to the furnace chamber. This, in turn, reduces the need for accommodating these variations in product produced in the past for subsequent metallurgical and/or alloying procedures outside the furnace chamber. Finally, because of the continuous nature of the process and apparatus herein, it is much more appropriate for utilization of further continuous application where a continuous length ultimate product is desired.

While the methods and forms of apparatus herein described constitute preferred embodiments of the invention, it is to be understood that the invention is not limited to these precise methods and forms of apparatus, and that changes may be made therein without departing from the scope of the invention, which is defined in the appended claims.

We claim:

1. A method for melting steel in a closed electric arc resistance furnace on a continuous basis, the steps which comprise
    (a) establishing a molten bath of steel and a slag layer thereover in said furnace prior to the addition of a charge to be reduced, said slag layer containing desulphurizing, desphosphorizing and decarbonizing materials,
    (b) continuously maintaining said slag layer at a thickness within the range of between about 250 and 1500 mm,
    (c) continuously maintaining said molten steel bath at a predetermined quantity,
    (d) heating said slag layer by electrodes immersed in said slag layer and heating said molten bath by means of convection heat from said slag layer,
    (e) continuously adding to said furnace on the top surface of said slag layer a charge comprised of a member selected from the group consisting of iron ore and sponge iron, pre-reduced pellitized iron ore and pre-reduced briquetted iron ore,
    (f) continuously withdrawing a portion of said slag layer from said furnace to maintain the thickness thereof, and
    (g) continuously withdrawing a portion of said molten steel bath at a point vertically below the point where said slag layer is withdrawn to maintain the predetermined quantity of said molten bath in said furnace.

2. The method of claim 1, further characterized by the step of
    (a) applying localized cooling to the upper area of said thick slag layer.

3. The method of claim 1, further characterized by
    (a) said heating step being carried out by hollow electrodes extending into said thick slag layer; and
    (b) including the additional step of adding oxidizing gas to said chamber through said hollow electrodes.

4. The method of claim 3, further characterized by
    (a) said adding step is carried out by adding a portion of said charge through said hollow electrodes.

* * * * *